United States Patent [19]

Frihart

[11] Patent Number: 5,612,448

[45] Date of Patent: Mar. 18, 1997

[54] CURABLE ADHESIVE COMPOSITIONS CONTAINING POLYAMIDE RESINS

[75] Inventor: Charles R. Frihart, Lawrenceville, N.J.

[73] Assignee: Union Camp Corporation, Wayne, N.J.

[21] Appl. No.: 426,448

[22] Filed: Apr. 21, 1995

Related U.S. Application Data

[63] Continuation of Ser. No. 128,392, Sep. 28, 1993, abandoned.

[51] Int. Cl.$^6$ ............................ C08G 69/00; C08G 69/26
[52] U.S. Cl. ...................... 528/339.5; 528/338; 528/341; 525/420.5; 525/423; 524/801; 524/607; 524/608
[58] Field of Search ...................... 524/801, 606, 524/607, 608; 523/414, 418; 528/338, 339.5, 341; 525/420.5, 423

[56] References Cited

U.S. PATENT DOCUMENTS

| | | | |
|---|---|---|---|
| 2,705,223 | 3/1955 | Renfrew et al. | 260/18 |
| 2,881,194 | 4/1959 | Peerman et al. | 260/404.5 |
| 2,930,773 | 3/1960 | Renfrew et al. | 260/18 |
| 2,999,826 | 9/1961 | Peerman et al. | 260/18 |
| 3,377,303 | 4/1968 | Peerman | 260/18 |
| 3,408,317 | 10/1968 | Vertnik | 260/18 |
| 4,082,708 | 4/1978 | Mehta | 260/18 N |
| 4,343,743 | 8/1982 | Coquard et al. | 260/404.5 |
| 4,485,233 | 11/1984 | Veazey | 528/295.3 |
| 4,566,931 | 1/1986 | Panoch et al. | 156/330.9 |
| 4,853,460 | 8/1989 | Harman | 528/339 |
| 4,886,844 | 12/1989 | Hayes | 523/223 |
| 5,025,043 | 6/1991 | Smith | 523/326 |
| 5,236,996 | 8/1993 | Smith | 524/608 |
| 5,385,986 | 1/1995 | Frihart | 525/420.5 |
| 5,428,083 | 6/1995 | Smith et al. | 523/414 |

*Primary Examiner*—Paul R. Michl
*Assistant Examiner*—U. K. Rajguru
*Attorney, Agent, or Firm*—Beth Kovitz Fields; Charles A. Gaglia, Jr.; Wendy A. Choi

[57] ABSTRACT

Hot melt adhesive compositions containing amine and acid terminated polyamide resins, optionally curable when combined with epoxy resins, wherein the amine component of the polyamide resin contains (i) 1,2-diaminopropane, (ii) a piperazine-containing diamine, and optionally, (iii) polyetherdiamines; the polyamide resins may be acid or amine terminated, and are characterized by having an acid plus amine number of up to 40, preferably up to 30, and more preferably up to 20; the adhesive compositions are useful in a number of applications and have good strength while exhibiting flexibility and low tackiness.

30 Claims, No Drawings

CURABLE ADHESIVE COMPOSITIONS CONTAINING POLYAMIDE RESINS

This application is a continuation of application Ser. No. 08/128,392 filed Sep. 28, 1993, now abandoned.

REFERENCE TO COPENDING APPLICATIONS

Curable polyamide adhesives containing 1,2-diaminopropane are described in copending U.S. application Ser. No. 907,888, filed Jul. 2, 1992, but the polyamide resins described therein are substantially free of piperazine-containing polyamines.

Thermoset adhesive compositions comprising a thermoplastic, substantially amine-terminated piperazine or polyetherdiamine containing polyamide resin are described in copending U.S. application Ser. No. 824,748, but 1,2-diaminopropane is not suggested as a preferred component, and the compositions are cured polymers, as distinct from the curable compositions of the present invention.

BACKGROUND OF THE INVENTION

1. Field of the Invention

This invention relates to new and improved curable adhesive compositions comprising amine and acid terminated polyamide resins, optionally together with epoxy resins, which are useful as curable hot-melt adhesives, potting compounds, molded products, sealants or coatings. These novel adhesive compositions are characterized by improved properties including high flexibility, low softening point and low tackiness, and good tensile strength, and are optionally used in the form of aqueous dispersions. The amine component of the polyamide resin comprises from about 90 to about 20 equivalent percent of 1,2-diaminopropane and from about 10 to about 80 equivalent percent of a piperazine-containing diamine. Optionally, up to about 20 equivalent percent of a $C_2$–$C_{12}$ polyamine may be employed.

Polyamides which are flexible usually do not have high strength and low tack, since flexibility requires a low modulus of elasticity, which is usually consistent with tackiness. Surprisingly, it has been found that the polyamides of the present invention which contain 1,2-diaminopropane possess not only a low modulus of elasticity, but also have low tackiness. These polyamides have excellent open times of 0.5 to 5 minutes; long enough to allow good bonding, but short enough to allow assembly line product. Most open times are less than a minute. This combination of properties provides compositions which are good adhesives for lamination applications. The reduced tack allows the adhesive polyamide compositions to be used to make coated roll stock. High strength together with flexibility gives products which can be used in many industrial applications where these properties must coexist, e.g., in book binding and shoe lasting. An optional embodiment of the present invention involves the use of the novel polyamides described herein to cure epoxy resins;

2. Brief Description of the Prior Art

It is known that dimer-based polyamides are useful for curing epoxy resins, as in U.S. Pat. Nos. 2,999,826 (Peerman et al.), U.S. Pat. No. 2,930,773 (Renfrew et al.), and U.S. Pat. No. 2,881,194 (Peerman et al.). The liquid polyamides described therein are mixed with liquid epoxies and allowed to cure. The resulting products possess little cohesive strength until sufficient curing occurs. Certain of the cured products are useful as adhesives, but have shortcomings in that such products are usually very rigid and possess limited ductility and flexibility.

Curable hot-melt compositions have been made using polyamide resins and epoxy resins as broadly described in U.S. Pat. No. 2,705,223 (Renfrew et al.). The polyamides comprise the condensation products of polymeric fatty acids with aliphatic polyamines. Compositions varying from 10% epoxy resin and 90% polyamide resin to 90% epoxy resin and 10% polyamide resin are disclosed. Typically, the compositions taught by Renfrew do not possess good adhesive strength upon cure and provide limited working time after the mixing of the components. In addition, such compositions exhibit poor flexibility and poor resistance to heat, water and organic solvents when applied to substrates at ambient temperature.

The prior art teaches that adhesives having improved flexibility can be obtained by incorporating piperazine into polyamide resins. For example, U.S. Pat. No. 4,853,460 (Harman) discloses an uncured polyamide composition wherein the amine component consists of about 25 to 75 percent equivalents of a cyclic diamine such as piperazine, a non-cyclic aliphatic diamine in which the amine groups are bonded to odd-numbered carbon atoms on the aliphatic chain, such as 2-methyl-1,5-pentanediamine, and one or more alkylene diamines. The resulting compositions, however, exhibit more tackiness than the compositions of the present invention. Changes in the formulation to lower the modulus, lead also to a large decrease in strength. In addition, the low modulus and low viscosity materials suffer from cold flow, i.e., they creep at ambient temperatures. U.S. Pat. No. 4,082,708 (Mehta), teaches an adhesive system comprising an epoxy resin and a polyamide wherein the polyamide is derived substantially from 1,4-(bis-aminoalkyl)piperazine. Although useful as cured products, these piperazine-based polyamide compositions exhibit poor recovery and limited flexibility. In addition, the piperazine-containing polyamides readily absorb aqueous and organic solvents and hydrolyze easily. It has been proven to be particularly difficult to achieve hot-melt compositions having good solvent and water resistance using the piperazine-containing polyamides of the prior art.

In U.S. Pat. No. 4,566,931 (Panoch et al.), there is described a heat sealable non-cured adhesive consisting essentially of copolyamides produced from omega amino carboxylic acids or lactams having 6 to 12 carbon atoms, dicarboxylic acids, and alpha-omega diamines wherein at least about 30% by weight of the diamines consist of singly branched diamine having 6 carbon atoms.

The use of 1,2-diaminopropane in preparing polyamide resins is also known in the art, as for example in U.S. Pat. No. 3,408,317 (Vertnik); however, there it is used preferably in a minor proportion along with ethylene diamine, and 1,3-diaminopropane is taught to be essentially equivalent thereto. U.S. Pat. No. 3,377,303 (Peerman) recites 1,2-diaminopropane among other diamines which may be used together with an essential piperazine-containing diamine component of the polyamide. However, only ethylene diamine is demonstrated in actual use, and there is no appreciation of the unique properties conveyed by use of 1,2-diaminopropane.

While various diamines have been used to prepare adhesive polyamide resins heretofore, there has been no suggestion of the unexpected properties obtainable with the particular combination of 1,2-diaminopropane and piperazine-containing diamines which characterize the novel polyamide compositions of the present invention.

SUMMARY OF THE INVENTION

The present invention provides unique hot melt adhesive compositions comprising amine and acid terminated polyamide resins, optionally curable when combined with epoxy resins, wherein the amine component of the polyamide resin comprises (i) 1,2-diaminopropane, (ii) a piperazine-containing diamine, and optionally, (iii) polyetherdiamines. The polyamide resins may be acid or amine terminated, and are characterized by having an acid plus amine number of up to 40, preferably up to 30, and more preferably up to 20.

In accordance with the present invention there is further provided methods and articles of manufacture which utilize the adhesive compositions of the present invention.

DETAILED DESCRIPTION OF THE INVENTION

The present invention pertains to improved adhesive polyamide compositions characterized by flexibility, high strength, and low tack. Polyamides, including those of the present invention, are the reaction product of an acid component with an amine component. The properties of the polyamides are greatly influenced by using different diamines. Although the rationalization of performance for the compositions of the present invention may not be totally correct, the understanding for the effect of the diamines is set out below. The linear, even chain length diamines, such as ethylenediamine and hexamethylenediamine give rigid polyamides due to high crystallinity and hydrogen bonding between the chains. Use of secondary diamines, such as piperazine, gives flexibility because there are few hydrogen bonding crosslinks between the chains. It has also been discovered that use of amines with odd length chains between the amine groups gives polyamides with long open times. However, from the literature data, it is apparent that high levels of these odd chain length diamines give products of low strength, while the flexibility of these materials is due to the small amount of hydrogen bond crosslinking. But the use of high levels of these diamines or piperazine to gain flexibility can lead to products that have low strength, are tacky and will cold flow. By contrast, it has been found that 1,2-diaminopropane has enough hydrogen bonding to give the resulting polyamide good crystallinity and strength, while at the same time the interactions are low enough that the polyamide product has good flexibility.

The acid component of the polyamide composition of the present invention comprises non-linear polymerized fatty acids, and optionally, at least one acid selected from the group consisting of linear dicarboxylic and monocarboxylic acids. Thus, the acid component will comprise from about 100 to about 0 equivalent percent dimer acid, from about 0 to about 100 equivalent percent of a $C_2$–$C_{12}$ diacid, and, optionally, a monoacid.

The polymeric fatty acids, sometimes referred to as "dimer acids" are complex mixtures resulting from the polymerization of fatty acids. The term "dimer acid" is in common use in the resin field and refers to nonlinear polymeric or oligomeric fatty acids typically made from addition polymerization of unsaturated tall oil fatty acids. These polymeric fatty acids typically have the composition 0–10% $C_{18}$ monobasic acids, 60–95% $C_{36}$ dibasic acids, and 1–35% $C_{54}$ tribasic and higher polymeric acids. The relative ratios of monomer, dimer, trimer and higher polymer in unfractionated "dimer acid" are dependent on the nature of the starting material and the conditions of polymerization and distillation. Methods for the polymerization of unsaturated fatty acids are described, for example, in U.S. Pat. No. 3,157,681. The dimer content is also controlled by the fractionation conditions used to reduce the monomer, trimer and higher polymer components. Non-linear dicarboxylic acids having 21 to 44 carbon atoms are preferred. Polymeric fatty acids having a dimeric fatty acid content greater than about 65 percent by weight are also preferred. For light color and better color stability, these dimer acids can be hydrogenated.

The dimer acids may be employed alone, or they may be used together with linear dicarboxylic and monocarboxylic acids, and thus will comprise from about 100 to 0 equivalent percent of the acid component. Preferably, the acid component will comprise from about 100 to about 30 equivalent percent dimer acid, and more preferably from about 90 to about 30 equivalent percent of the dimer acid.

A wide variety of linear dicarboxylic acids having 2 to about 24 carbon atoms may also be employed together with the polymeric fatty acids in the preparation of the compositions of the invention. Preferred dicarboxylic acids have from 6 to 22 carbon atoms and include adipic, pimelic, suberic, azelaic, sebacic, dodecanedioic acids, and mixtures thereof. Methods of preparing these preferred acids are well known and they are readily available commercially. Even more preferred are adipic, azelaic, sebacic and dodecanedioic acids. It should be understood that use of the corresponding anhydrides, esters and acid chlorides of these acids is included in the term "dicarboxylic acid". Aromatic dicarboxylic acids or their corresponding anhydrides, esters or acid chlorides may also be used. These acids include phthalic, isophthalic and terephthalic acids.

Linear dicarboxylic acids may be used alone as the acid component, or may be combined with dimer acids, and are thus added to the reaction mixture in amounts ranging from about 0 up to about 100 equivalent percent (i.e., 0–100% of the total acid groups present in the mixture before polymerization are derived from the linear dicarboxylic acid component). Preferably 0 to about 70 equivalent percent of a $C_6$–$C_{12}$ diacid is employed, while more preferably about 10 to about 70 equivalent percent of a $C_9$–$C_{12}$ diacid is employed, based on total equivalents of the acid component.

A linear monocarboxylic acid may be added in addition to the dimer acid and/or linear dicarboxylic acid as a second or third part of the acid component, in amounts up to about 15 equivalent percent, to control the molecular weight and/or to change the ratio of amine to acid groups. Preferred monocarboxylic acids are linear and have 2 to 22 carbon atoms. Most preferred are stearic acid and tall oil fatty acids, oleic acids and mixtures thereof.

Consequently, overall the acid component preferably comprises about 30–100 equivalent percent of polymeric fatty acids, and about 0–70 equivalent percent of at least one acid selected from the group consisting of $C_6$–$C_{12}$ linear dicarboxylic acids and monocarboxylic acids, based upon total equivalents of the acid component. More preferably, the acid component is comprised of about 30–90 equivalent percent of polymeric fatty acids, 10–70 equivalent percent of at least one acid selected from the group consisting of $C_9$–$C_{12}$ linear dicarboxylic acids and linear monocarboxylic acids, based on total equivalents of the acid component. Thus, the polyamides of the present invention can comprise the reaction product of an acid component consisting essentially of one or more polymeric fatty acids, and an amine component.

As indicated, the unexpected advantageous properties of the polyamide resin compositions of the present invention result for the most part from the amine component of the polyamide. Particularly, these properties result from the use of 1,2-diaminopropane in combination with piperazine-containing diamines. The 1,2-diaminopropane component is especially important, and it is theorized that its compact, yet branched structure may be responsible for the unique properties of the polyamide compositions of the present invention.

The amine component of the polyamide compositions of the present invention will comprise from about 90 to about 30 equivalent percent of 1,2-diaminopropane, and from about 10 to about 70 equivalent percent of a piperazine-containing diamine, described in detail further below, while optionally, from about 0.5 up to about 10 equivalent percent of the amine component may amine comprise a polyetherdiamine of the type described in detail further below. Preferably, the amine component will comprise from about 80 to about 40 equivalent percent of 1,2-diaminopropane, and from about 20 to about 60 equivalent percent of a piperazine-containing diamine, with optionally from about 1.0 up to about 9 equivalent percent of a polyetherdiamine. More preferably, the amine component will comprise from about 70 to about 50 equivalent percent of 1,2-diaminopropane, and from about 30 to about 50 equivalent percent of a piperazine-containing diamine, with optionally from about 2.0 up to about 8 equivalent percent of a polyetherdiamine.

Examples of suitable piperazine-containing polyamines include piperazine, or piperazine derivatives, including 1,2-di(1-piperazinyl)propane, 1,3-di-(1-piperazinyl)propane, 1,2-di-(1-piperazinyl)ethane, 1,4-di-(1-piperazinyl)butane, and N-hydroxyethylpiperazine.

Polyetherdiamines provide products with better low temperature impact strength properties. Polyetherdiamines are added in amounts of from about 1 to about 10 equivalent percent; preferably from about 2 to about 8 equivalent percent; and more preferably from about 3 to about 6 equivalent percent. The most preferred polyetheradiamines include diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000. Polyetherdiamines are considered to include triamines made from propylene oxide polymers or ethylene oxide polymers and having molecular weights of from 100 to about 8000.

The present invention also contemplates the use of $C_2$–$C_{12}$ polyamines which are optionally utilizable in preparing the polyamide resins of the present invention, in order to achieve modifications of the properties of the end product resins, which are well understood in the art. Such polyamines comprise linear diamines well known in the art, e.g., ethylene diamine, 1,4-butanediamine, hexamethylenediamine, 1,7-heptanediamine, and 1,9-nonanediamine. However, it is preferred to use the even chain length linear diamines such as ethylenediamine.

The relative equivalent weight amounts of the 1,2-diaminopropane component and the piperazine-containing polyamine component, as well as of the optional linear diamine component, in the amine component of the polyamide can be varied to achieve a polyamide with the desired flexibility, elasticity, non-brittleness, low-tack and tensile strength.

Equivalent percent values as used herein are determined as follows. The total number of free acid groups in the acid component added to the polymerization reaction is set equal to 100 equivalent percent. The equivalent percent of amine component is then based on that of acid component; i.e., the total number of free amine groups in the amine component added to the polymerization reaction is expressed as a percentage of the total number of free acid groups.

The techniques and general methods for polymerizing the mixed reactants of the polyamide compositions of the present invention are well known; see, for example, U.S. Pat. Nos. 3,377,303, 4,343,743 and 4,485,233. In general, the polyamides of the present invention are prepared by charging a resin kettle with the reactants, in proportions herein described, and heating the mixture to a temperature at which random polymerization occurs. In general, the reactants are heated to a temperature of from about 140° C. to about 200° C. to initiate polymerization, and thereafter at a temperature sufficient to distill off the water of condensation. Preferably, the heating is carried out under an inert gas atmosphere such as a blanket of nitrogen gas. The completion of the polymerization is aided by removing the final traces of water using a vacuum and elevated temperatures. To assist polymerization, a polymerization catalyst may be added in catalytic proportion. Representative of such catalysts are phosphoric acid, triphenylphosphite, or tin salts. The heating of the reaction mixture may be carried out until a selected viscosity of the reaction mixture is reached, for example, 1,000–25,000 cps at 190° C., and preferably 2,000–10,000 cps at 190° C. In additions small amounts (0.5 to 10 equivalent percent) of a saturated linear carboxylic acid containing 5–20 carbons such as, for example, stearic acid, or other monomers such as phenylbenzoate may be added to the mixture to control molecular weight and viscosity.

The resulting polyamide resin is thermoplastic, i.e., is essentially a hot melt adhesive, although not of the thermoset variety, and may be utilized in its uncured state, that is, without combining it with epoxy resin, since even in their uncured state the polyamides of the present invention are strong adhesives which possess excellent flexibility. These polyamide resins provide good adhesion to a variety of surfaces, e.g., leather and other tanned animal skins, vinyl based polymers such as polyvinyl chloride, and other synthetic polymer materials, natural and synthetic rubber, wood, paper, metals, glass, ceramics and so forth. Thus, the polyamide resin adhesive compositions of the present invention will be useful in a wide variety of industries, arts and end uses. For such applications, the adhesive bonding is preferably accomplished by use of a conventional hot melt technique such as by application of the molten resin or extruded rod of resin with the application of heat. Due to its reduced tackiness and resultant shortened open time, the resin may also be interposed in the form of a sheet or film, grindings or powder which upon application of heat followed by cooling provides the bonded article. Although high pressure is not required for the bonding operation, the application of some pressure will prove advantageous. The high strength combined with flexibility which characterizes the polyamide resins of the present invention, makes their use in these applications especially advantageous. The polyamide resins of the present invention exhibit improved adhesion to polycarbonate substrates, compared to closely related polyamides of the prior art, which proves especially important in heat sealing of protective films to polycarbonate substrates, e.g., food and medical packaging containers.

Alternatively, the thermoplastic resin can be combined with various epoxy resins as described herein to achieve a cured product with good flexibility and tensile strength.

The present invention is applicable to epoxy resins having two or more epoxy groups per molecule of epoxy resin. The preferred epoxy resins are multifunctional, that is, they have a functionality equal to or greater than 2, in order to develop good heat resistance. The most preferred epoxy resins have from at least 2, and preferably about 2.2 to about 8 epoxy groups per molecule. The epoxy compositions which may be used for curing are generally linear epoxies based upon the diglycidyl ether of bisphenol A or bisphenol A oligomers, or branched types based upon the multi-glycidyl ethers of phenolformaldehyde or cresol-formaldehyde resins, or epoxidized olefins, including unsaturated fatty oils. The most preferred epoxy resins are multifunctional epoxy novalac resins such as the D.E.N.™ epoxy novalac resins sold by The Dow Chemical Company (Midland, Mich.). D.E.N. 431 has an average of 2.2 epoxy groups per molecule, D.E.N. 438 has an average functionality of 3.6, and D.E.N. 439 resin has an average functionality of 3.8.

It is preferred if the initial (i.e., prior to mixing) ratio of free amine and acid groups of the polyamide resin to epoxy groups of the epoxy resin is between about 1:1 and 1:10. It is more preferred if the ratio of free amine and acid groups to epoxy groups is between about 1:1 and 1:6. The most preferred ratio is between about 1:1.5 and 1:4.

It will be evident to one skilled in the art of adhesive formulation that other additives such as fillers, reinforcing agents, coupling agents, colorants, odorants, other comonomers, resins, tackifiers, plasticizers, lubricants, stabilizers, antistats, and the like can optionally be added. In addition, antioxidants can be added at any point during the reaction sequence.

The application and curing of the polyamide-epoxy resin composition is effected very simply. The polyamide and epoxy resins may be melted separately, subsequently mixed together and then coated upon the substrate as a molten mixture. Alternatively, one of the components may be melted first and then the other component admixed with it. The reaction temperature will generally not exceed 190° C., since at higher temperatures some cracking or premature polymerization of the reaction products will occur. Of course, a coating of the molten thermoset compositions may be applied upon any or all areas or surfaces of one or more substrates.

For the alternative thermoset adhesive compositions of the present invention comprising mixtures of polyamide and epoxy resins, the method for bonding at least a first and second substrate comprises the steps of coating one surface of the first substrate with the molten thermoset compositions of the present invention, contacting the second substrate to the coated surface of the first substrate, and allowing the composition to cure. The thermoset compositions will cure at room temperature; alternatively, pressure and/or heat may be applied to the first and second substrates after contacting the second substrate to the coated surface of the first substrate in order to accelerate the cure. The curing temperature will generally be between about 10° C. and about 100° C. and the times from on the order of 2 hours at the higher temperature to approximately 2 weeks at the lower temperature. Curing accelerators can be added to the hot-melt compositions if desired.

The thermoset compositions may be applied to a wide variety of substrates, including rigid or flexible, natural or synthetic materials, which require an adhesive of high strength, durability and resistance. They may be employed to adhere to leather, suede, woven and nonwoven fabrics, rubber, polyurethanes, vinyl, polycarbonate, polystyrene, and the like. They are also useful for hot melt bonding materials such as metals, wood, glass, paper products and the like.

The resultant products, after application and upon cooling, are thermoset having good initial adhesive strength at room temperature. The term thermoset, as used herein, denotes a material that either will undergo or has undergone a chemical reaction by the action of heat, catalysts, ultraviolet light or other means, leading to a relatively infusible state. Upon curing, the thermoset compositions demonstrate improved organic solvent resistivity, water resistivity and heat resistivity.

Moreover, after cure, the thermoset compositions of the present invention possess excellent bond strengths and superior heat resistance. In addition, these thermoset compositions, as well as the hot-melt single component polyamide compositions, possess low brittleness, good elasticity, and excellent flexibility and ductility. Adhesives made of these compositions of the present invention do not become rigid even months after they are applied.

It has been recognized that certain of the problems associated with the polyamide resins might be solved if the polyamides could be applied at ambient temperatures as dispersions; and to overcome or at least reduce problems associated with solvent-based systems, it has been suggested to prepare emulsions or dispersions of the polyamide resins in water. Certain of the problems associated with aqueous polyamide resin dispersions can be obviated by the methods disclosed in U.S. Pat. No. 4,886,844 (Hayes) for the preparation of stable aqueous dispersions of nonsolvated, unneutralized, polymerized fatty acid polyamide resins having low acid and amine number. As disclosed therein, molten resin, water, and a surfactant are subjected to sufficient comminuting forces to form an emulsion in which resin droplets have a volume average size distribution of about 20 microns or less.

The polyamide dispersions useful in the present invention may be produced by first forming a water-in-oil emulsion by mixing together at a first temperature the polyamide resin, water, at least one surfactant, and optionally a neutralizing acid or base, wherein the water and surfactant are present in amounts effective to form the water-in-oil emulsion, and the neutralizing acid or base is present, when used, in an amount effective to neutralize any residual acid or base on the polyamide resin. The first temperature is effective to liquify the polyamide resin and to maintain an oil phase of a water and oil emulsion as a liquid. The aqueous dispersions are then formed by mixing together at a second temperature less than the first temperature the water-in-oil emulsion and a second amount of water effective to form an oil-in-water emulsion. The oil-in-water emulsion is then cooled to a third temperature effective to form the aqueous dispersion. In a preferred embodiment, at least one water soluble, dipolar chemical moiety is added to either the oil-in-water emulsion at the second temperature or to the aqueous dispersion in an amount effective to stabilize the aqueous dispersion.

The resulting stable, aqueous dispersions of the polyamide resins which are obtained are especially useful when applied as coatings for hot-melt adhesive applications, or utilized in coatings, inks, and the like.

Those skilled in the art will appreciate that emulsions of polyamide resin in water, more commonly known as oil-in-water emulsions, are to be contrasted with emulsions of water in resin, which emulsions are more commonly known as water-in-oil emulsions. Techniques for converting water-in-oil emulsions to oil-in-water emulsions are generally known to those skilled in the art as inversions. The water added to invert an emulsion is known as inversion water. The conversion of an oil-in-water emulsion to a water-in-oil emulsion is also known as an inversion. The term "oil phase" as referred to herein is understood to mean that phase of either the water-in-oil or the oil-in-water emulsion which includes the piperazine-containing polyamide resin and at least one surfactant.

It will be appreciated that a wide variety of water soluble surfactants can be employed successfully in preparing dispersions of the present invention, in part because of the relative neutral charge of most of the polyamide resins of the present invention. The surfactant or combination of surfactants which are preferred for the polyamide dispersions of this invention are ones which will promote the emulsification of the molten polyamide resin and the water, and which will also act to stabilize the final dispersion of the polyamide resin particles in the water. Those skilled in the art will recognize that the choice of a surfactant will depend intimately upon the particular polyamide resin employed. The surfactants which are selected are those which are capable of acting either as oil-in-water or water-in-oil emulsifying agents for the polyamide resin-water mixture. The surfactants include well known anionic, polar and non-polar non-ionic, amphoteric, and cationic surfactants.

Among the surfactants which have been found to be especially useful are the non-ionic surfactants Tergitol™ NP-40 and Tergitol™ 15-S-40 (Union Carbide, Danbury, Conn.) and Igepal™ CO-850 and Igepal™ CO-870 (GAF Corporation, Wayne, N.J.).

While all surfactants are not suitable for use in preparing the polyamide resin dispersions of the present invention, it has been found that a wide range of surfactants are suitable. It is relatively simple to screen suitable surfactants for use in the present invention. It was found for certain embodiments, for example, that the preferred surfactants are those which exhibit outstanding ability to cause the emulsification of the water in the liquified polyamide resin. These surfactants must also have the ability to form emulsions of the liquified polyamide resin in the water upon inversion of the water-in-oil emulsion. These surfactants are typically also highly effective for imparting long term stability to the final dispersion. The relative amount of the employed surfactant added is based upon the amount of the polymerized fatty acid polyamide resin which is to be present in the final dispersion and upon the particular surfactant used. It has been found, however, that optimum results are obtained when the surfactant is used in an amount from about 0.05% to about 10% by weight, based on the weight of the polymerized fatty acid polyamide resin.

It is believed that an effective amount of piperazine allows either the homogeneous mixture of liquified polyamide resin and surfactant or the water-in-oil emulsion to be cooled below the ring and ball softening point of the neat polyamide resin, while still maintaining the oil phase of the emulsion in the liquid state. The "melting point of the oil phase" is that temperature below which the resin droplets solidify to form the aqueous dispersion. This allows the inversion of the water-in-oil emulsion to the oil-in-water emulsion to occur below the ring and ball softening point of the neat polyamide resin. The polyamide resin preferably contains from about 1–30 weight percent of piperazine, and more preferably from about 5–20 weight percent of piperazine.

It will be appreciated that polyamide resins typically contain residual acid or base attributable to the synthetic source of the resin. While it is preferred that aqueous dispersions be formed from polymerized fatty acid polyamide resins which have relatively low (i.e., less than about 12) acid or amine numbers, aqueous dispersions have been formed from polyamide resins with acid numbers up to about 45 and amine numbers up to about 250. It will be appreciated that acid number represents the titratable acid present in a gram of resin expressed in terms of milligrams potassium hydroxide required to neutralize that amount of acid. Likewise, amine number represents the acid titratable amine groups present in a gram of resin expressed in terms of equivalent milligrams potassium hydroxide.

It is preferred in accordance with this invention that a polyamide resin's residual acid or base be neutralized to some empirically determined level prior to formation of aqueous dispersions. The preferred degree of neutralization will vary from resin to resin and will be manifested by incremental improvement in the performance properties of aqueous dispersions prepared therefrom. Preferred neutralizing bases are potassium hydroxide, sodium hydroxide, ammonium hydroxide, and ethanolamines. Preferred neutralizing acids are acetic acid, hydrochloric acid, sulfuric acid, and phosphoric acid.

Further details concerning preparation of polyamide resin dispersions of the type described above may be found in U.S. Pat. No. 5,236,996, issued Aug. 17, 1993, which is incorporated herein by reference.

Other methods for preparing polyamide dispersions suitable for use in the present invention are those described in U.S. Pat. No. 5,025,043, which is incorporated herein by reference, in its entirety.

The invention will be made clearer by reference to the following examples. These examples are presented for the purpose of illustration and to further set forth the best mode of carrying out the invention. These examples are not to be construed as limiting the appended claims.

Comparison Examples 1–4

In order to demonstrate the superior properties of the polyamide resins of the present invention achieved with the combination of 1,2-diaminopropane and piperazine-containing diamines as described above, three samples for testing were prepared using similar conditions in which 1,2-diaminopropane in the first polyamide resin (1) was replaced with ethylenediamine and 1,3-diaminopropane to prepare polyamide resins (2) and (3), respectively, for comparison.

Polyamide Resin (1): 605.56 g of UNIDYME® 14 polymerized fatty acid (from Union Camp Corporation, Wayne, N.J.) and 216.6 g of sebacic acid; 10.0 g of amine antioxidant Vanox 1081 (Vanderbilt Corp.); and 5.16 g of amine antioxidant Irganox™ 1010, tetrakis(methylene(3,5-di-tert-butyl-4-hydroxyhydrocinnamate)) methane (from Ciba-Geigy Corporation, Ardsley, N.Y.) were warmed in a reaction kettle equipped with a mechanical stirrer, nitrogen inlet, thermocouple, Barrett trap, and a condenser. When the temperature reached about 80° C., 46.18 g of 1,2-diaminopropane and 122.7 g of piperazine were added. Water was collected in the trap until the temperature reached about 230° C. Then several drops of phosphoric acid were added. The nitrogen was removed, and the reaction was placed under vacuum for several hours to remove any remaining water. The molten polyamide was poured out for the various tests.

Polyamide Resins (2), (3) and (4): following the procedures set out above, but substituting the same equivalent percent of ethylenediamine, 1,3-diaminopropane, and 2-methyl-1,5-pentanediamine, the indicated samples were prepared for comparative testing.

In order to demonstrate that the combination of 1,2-diaminopropane and piperazine-containing diamines used in preparing the polyamide resins of the present invention confer advantageous properties, surprisingly not possessed by polyamides made from ethylenediamine and 1,3-diaminopropane, several analytical tests for measuring relevant properties of the resins were chosen, as described below.

Softening Point, Ring and Ball ASTM No. E-28

Viscosity at 190° C. Brookfield Thermosel System with RVT Viscometer and Spindle Tensile Strength, Percent Elongation, ASTM No. D 1708-84

The superior flexibility properties exhibited by the hot-melt compositions of this invention in comparison to the flexibility achieved by prior art compositions (as shown by comparison examples 1–3) are depicted in Table 1 below. The more flexible polyamide compositions of the invention have lower elastic-tensile moduli.

The improved lack of tackiness of the polyamide compositions of the present invention compared to related polyamide resins (2), (3) and (4) were investigated using the open time evaluation, the results of which are reported in Table 1 below.

TABLE 1

| Physical Properties | Polyamide Resin Prepared From: | | | |
| --- | --- | --- | --- | --- |
| | 1,2 diamino-propane Example 1 | Ethylene-diamine Example 2 | 1,3 diamino-propane Example 3 | 2-methyl-1,5-pentanediamine Example 4 |
| S.P., °C. | 111 | 158 | 94 | 98 |
| Visc. @190° C. | 9800 | 8500 | 9500 | 5,400 |
| Tensile strength, (psi) | 361 | 523 | 75 | 13 |
| % Elongation | 556 | 402 | 2000+ | 800+ |
| Modulus | 2355 | 12,690 | * | * |
| Open Time | 50 sec. | 10 sec. | >24 hrs. | >24 hours |

* Too weak to measure, accurately.

Tensile Modulus ASTM No. D 1708-84 using elastic modulus measurement technique defined in ASTM No. D 638-89

Open Time, ASTM No. D 4497

For purposes of this invention, the open assembly time for an adhesive composition may be measured using the test method described in ASTM Draft No. 1, Nov. 3, 1978, entitled, "Proposed Standard Test Procedure for Determining the Open Times of Hot Melt Adhesives", the disclosure of which is hereby incorporated by reference. Briefly, this test requires that film of the adhesive be cast while in the molten state onto kraft paper. Paper strips are then placed on the adhesive film at five second intervals, and the resulting composite is allowed to stand at ambient conditions for a period of time. The paper strips are then peeled away, and the time at which a 50 percent fiber tear is observed is denoted as the open assembly time of the adhesive.

The flexibility of the polyamide compositions was determined using several different measurement techniques. For example, the tensile moduli of the polyamide compositions described in the Examples herein was measured using an Instron. The elastic modulus for 0 to 4 percent elongation, as defined in ASTM No. D 638-89 (dated Jan. 27, 1989, entitled Standard Test Method for Tensile Properties of Plastics, see Annex A1.17) was measured using the sample preparation method and test method described in ASTM No. D 1708-84 (dated Jul. 27, 1984, entitled Standard Test Method for Tensile Properties of Plastics By Use of Microtensile Specimens), the disclosures of which are hereby incorporated by reference. The procedures set forth in these test methods were followed except that the samples were die cut from sheets having a thickness of approximately 0.07 inches and the cured samples were stored under ambient conditions for at least one week prior to testing. In addition, the crosshead speed on the chart recorder was set at two inches per minute. Data needed to determine the elastic modulus was collected and analyzed using the Instron Series IX Automated Materials Testing System, Version 5 (M22–12410–3, Issue A, August 1990).

As the softening point and viscosity data in Table 1 above demonstrate, the polyamide resin prepared from 1,2-diaminopropane is not adversely affected with respect to those properties, compared to the same properties for the polyamide resins prepared from 1,3-diaminopropane and ethylenediamine.

The polyamide resin prepared from 1,2-diaminopropane also retains high strength characteristics, as shown by the tensile strength (psi) data, which demonstrate that while the strength is not quite as high as that for the polyamide resin prepared from ethylenediamine, it is, on the other hand, surprisingly higher than the strength of the polyamide resins prepared from 1,3-diaminopropane and 2-methyl-1,5-pentanediamine.

While maintaining high strength characteristics, the polyamide resins of the present invention prepared from 1,2-diaminopropane possess at the same time a surprising degree of both flexibility and reduced tackiness, compared to similar polyamide resins prepared from 1,3-diaminopropane; and 2-methyl-1,5-pentanediamine, and ethylenediamine, which is demonstrated by the % elongation, modulus and open time data in Table 1 above. The improved flexibility is shown by the lower values for % elongation and modulus. Thus, the polyamide resins of the present invention prepared from 1,2-diaminopropane possess superior flexibility compared to polyamides prepared from ethylenediamine, 1,3-diaminopropane or 2-methyl-1,5-pentanediamine. While having this surprising superiority in flexibility properties while retaining high strength, the 1,2-diaminopropane based polyamides are also characterized by having a reduced tackiness, as shown by the open time data in Table 1 above. The reduced tackiness is similar to that of polyamides made from ethylenediamine, but is considerably better than that of the polyamide resins made from 1,3-diaminopropane and 2-methyl-1,5-pentanediamine.

EXAMPLE 5

A polyamide resin was prepared using the procedures given in Example 1, except that the preparation substituted 1209.3 g of dimer acid, 423.0 g of sebacic acid, 20.0 g Vanox 1081, 10.0 g of Irganox 1010, 100.5 g of 1,2-diaminopropane, and 266.9 mg of piperazine. The product had a 0.8 acid number, 12.3 amine number, a 9080 cps viscosity at 190° C., and a 101.5° C. softening point. The tensile testing gave a modulus of 2,657 psi, and a tensile strength of 267 psi, and a elongation of 704.5.

EXAMPLE 6

The polyamide in Example 5 was cured by melting 75.0 g of the polyamide in a tin can in a 190° C. oven, then mixing in 7.5 g of DEN 439 (from Dow Chemical, Midland, Mich.). The product was non-melting after setting at ambient temperatures for several days. The product had a tensile modulus of 1961 psi, a tensile strength of 2816 psi, and an elongation of 192%. Thus, the curing process dramatically improved the strength while retaining good flexibility.

EXAMPLE 7

A polyamide resin was prepared using the procedures given in Example 1, except that the preparation substituted involved 627.7 g of dimer acid, 379.0 g of sebacic acid, 32.4 g of stearic acid, 10.5 g Vanox 1081, 3.5 g of Irganox 1010, 7.0 g of microcrystalline wax, 80.6 g of 1,2-diaminopropane, 157.7 g of piperazine, 20.7 g of Jeffamine D-400 (from Texaco Chemicals), and 101.7 g of Jeffamine D-2000, both polyoxypropylene diamine compositions. The product had a 12.8 acid number, 0.9 amine number, a 2,038 cps viscosity at 190° C., and a 117° C. softening point. The tensile testing gave a modulus of 3,249, and a tensile strength of 324 psi, and an elongation of 126%.

EXAMPLE 8

A polyamide resin was prepared using the procedures given in Example 1, except that the preparation substituted 395.0 g of dimer acid, 35.5 g of sebacic acid, 5.0 g Vanox 1081, 2.5 g of Irganox 1010, 40.3 g of 1,2-diaminopropane, and 31.2 g of piperazine. The product had a 0.9 acid number, 9.4 amine number, a 2,875 cps viscosity at 190° C. and a 98° C. softening point The tensile testing gave a modulus of 2,390, and a maximum stress of 94 psi. This material had very unique elasticity for an uncured material such that after elongation 460%, upon release of the force, the samples recovered to a 81% elongation.

Comparative Example 9

The preparation procedures in Example 8 were repeated except that an equivalent weight of 1,3-diaminopropane was substituted for the 1,2-diaminopropane. This polyamide had a 0.9 acid number, 9.9 amine number, a 3,520 cps viscosity at 190° C. and a 93.4° C. softening point. The tensile properties of this product could not be measured since within twenty-four hours the dogbone-shaped samples had completely distorted due to cold flow. This is to be contrasted with the results for the product of the present invention in Example 8, which not only did not exhibit cold flow, but demonstrated an elastic recovery as well.

EXAMPLE 10

In a resin kettle with a turbine blade agitator and a condenser, 100 g of the polyamide in Example 1 is melted at 160° C. Then a warm solution of 0.7 g of 85% potassium hydroxide, 20 g of distilled water, 7.2 of Tergitol NP40 nonionic surfactant (Union Carbide Corporation, Danbury, Conn.) is added while stirring at 500 rpm and allowing the temperature of the mixture to drop to 100° C. The mixture is stirred for 30 minutes. A solution of 0.5 g of glycine in 130 g of water is added over 45 minutes with vigorous agitation and keeping the pot temperature near 100° C. The mixture is cooled to room temperature while agitation is maintained. The product was a fluid dispersion with good storage stability. A film of the dispersion was drawn on a selected substrate. After drying, the substrate was heat sealed to another sample of the substrate. This dispersion gave excellent heat seal bonds for polyvinylchloride, aluminum and polycarbonate.

What is claimed is:

1. A polyamide resin having flexibility, high strength, and low tack comprising the condensation product of an acid component comprising non-linear polymerized fatty acids, and optionally, at least one acid selected from the group consisting of linear dicarboxylic and monocarboxylic acids; and an amine component comprising from about 90 to about 30 equivalent percent of 1,2-diaminopropane, and from about 10 to about 70 equivalent percent of a piperazine-containing diamine, with optionally from about 0.5 up to about 10 equivalent percent of the amine component comprising polyetherdiamine.

2. A polyamide resin according to claim 1 wherein the acid component comprises about 30–100 equivalent percent of polymeric fatty acids, and about 0–70 equivalent percent of at least one acid selected from the group consisting of $C_6$–$C_{22}$ linear dicarboxylic acids and monocarboxylic acids, based upon total equivalents of the acid component.

3. A polyamide resin according to claim 2 wherein the amine component comprises from about 80 to about 40 equivalent percent of 1,2-diaminopropane, and from about 20 to about 60 equivalent percent of a piperazine-containing diamine, with optionally from about 1.0 up to about 9 equivalent percent of a polyetherdiamine.

4. A polyamide resin according to claim 3 wherein the amine component comprises from about 70 to about 50 equivalent percent of 1,2-diaminopropane, and from about 30 to about 50 equivalent percent of a piperazine-containing diamine, with optionally from about 2.0 up to about 8 equivalent percent of a polyetherdiamine.

5. A polyamide resin according to claim 4 wherein the piperazine-containing polyamine comprises a member selected from the group consisting of piperazine, 1,2-di(1-piperazinyl)propane, 1,3-di-(1-piperazinyl)propane, 1,2-di-(1-piperazinyl)ethane, 1,4-di-(1-piperazinyl)butane, and N-hydroxyethylpiperazine; and the polyetherdiamine comprises a member selected from the group consisting of diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000, including triamines made from propylene oxide polymers or ethylene oxide polymers and having molecular weights of from 100 to about 8000.

6. A polyamide resin according to claim 5 wherein the piperazine-containing polyamine comprises piperazine.

7. A two-component curable composition comprising:
   (1) a thermoplastic polyamide resin having flexibility, high strength, and low tack comprising the condensation product of an acid component comprising non-linear polymerized fatty acids, and optionally, at least one acid selected from the group consisting of linear dicarboxylic and monocarboxylic acids; and an amine component comprising from about 80 to about 40 equivalent percent of 1,2-diaminopropane, and from about 20 to about 60 equivalent percent of a piperazine-containing diamine, with optionally from about 0.5 up to about 10 equivalent percent of the amine component comprising polyetherdiamine;

(2) an epoxy resin, said epoxy resin having at least two epoxy groups per molecule of epoxy resin;

wherein the initial ratio of free amine and acid groups of the polyamide resin to epoxy groups of the epoxy resin is between about 1:1 and 1:10.

8. A composition according to claim 7 wherein for the polyamide component, the amine component thereof comprises from about 70 to about 50 equivalent percent of 1,2-diaminopropane, and from about 30 to about 50 equivalent percent of a piperazine-containing diamine, with optionally from about 2.0 up to about 8 equivalent percent of a polyetherdiamine.

9. A composition according to claim 8 wherein the piperazine-containing polyamine comprises a member selected from the group consisting of piperazine, 1,2-di(1-piperazinyl)propane, 1,3-di-(1-piperazinyl)propane, 1,2-di-(1-piperazinyl)ethane, 1,4-di-(1-piperazinyl)butane, and N-hydroxyethylpiperazine; and the polyetherdiamine comprises a member selected from the group consisting of diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000, including triamines made from propylene oxide polymers or ethylene oxide polymers and having molecular weights of from 100 to about 8000.

10. A composition according to claim 9, wherein for the polyamide resin component, the piperazine-containing polyamine comprises piperazine.

11. A stable, aqueous dispersion of polyamide resin particles in water, wherein said resin has flexibility, high strength, and low tack, comprising:

(a) between about 20% and about 60% by weight of a polyamide resin comprising the condensation product of an acid component comprising non-linear polymerized fatty acids, and optionally, at least one acid selected from the group consisting of linear dicarboxylic and monocarboxylic acids; and an amine component comprising from about 90 to about 30 equivalent percent of 1,2-diaminopropane, and from about 10 to about 70 equivalent percent of a piperazine-containing diamine, with optionally from about 0.5 up to about 10 equivalent percent of the amine component comprising polyetherdiamine;

(b) between about 30% and about 70% by weight water; and (c) at least one surfactant in an amount effective to form a water-in-oil emulsion upon liquification of the polyamide resin.

12. The aqueous dispersion of claim 11 further comprising an amount of acid or base effective to neutralize residual acid or base on the polyamide resin.

13. The aqueous dispersion of claim 11 wherein the surfactant is selected from the group consisting of anionic, cationic, non-ionic, and amphoteric surfactants.

14. The aqueous dispersion of claim 11 wherein the amount of surfactant effective to form the water-in-oil emulsion is from about 0.05% to about 10% by weight, based on the weight of the polyamide resin.

15. The aqueous dispersion of claim 11 wherein the piperazine-containing polyamide resin particles have a volume average size distribution of between about 1–20 microns.

16. A method of increasing flexibility and strength while reducing tackiness of a polyamide resin comprising the step of condensing an acid component comprising non-linear polymerized fatty acids, and optionally, at least one acid selected from the group consisting of linear dicarboxylic and monocarboxylic acids; and an amine component comprising from about 90 to about 30 equivalent percent of 1,2-diaminopropane, and from about 10 to about 70 equivalent percent of a piperazine-containing diamine, with optionally from about 0.5 up to about 10 equivalent percent of the amine component comprising polyetherdiamine.

17. The method of claim 16 wherein the acid component comprises about 30–100 equivalent percent of polymeric fatty acids, and about 0–70 equivalent percent of at least one acid selected from the group consisting of $C_6$–$C_{22}$ linear dicarboxylic acids and monocarboxylic acids, based upon total equivalents of the acid component.

18. The method of claim 17 wherein the amine component comprises from about 80 to about 40 equivalent percent of 1,2-diaminopropane, and from about 20 to about 60 equivalent percent of a piperazine-containing diamine, with optionally from about 1.0 up to about 9 equivalent percent of a polyetherdiamine.

19. The method of claim 18 wherein the amine component comprises from about 70 to about 50 equivalent percent of 1,2-diaminopropane, and from about 30 to about 50 equivalent percent of a piperazine-containing diamine, with optionally from about 2.0 up to about 8 equivalent percent of a polyetherdiamine.

20. The method of claim 19 wherein the piperazine-containing polyamine comprises a member selected from the group consisting of piperazine, 1,2-di(1-piperazinyl)propane, 1,3-di-(1-piperazinyl)propane, 1,2-di-(1-piperazinyl)ethane, 1,4-di-(1-piperazinyl)butane, and N-hydroxyethylpiperazine; and the polyetherdiamine comprises a member selected from the group consisting of diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000, including triamines made from propylene oxide polymers or ethylene oxide polymers and having molecular weights of from 100 to about 8000.

21. The method of claim 20 wherein the piperazine-containing polyamine comprises piperazine.

22. A method of increasing flexibility and strength while reducing tackiness of a two-component curable composition comprising the step of combining:

(1) a thermoplastic polyamide resin prepared by condensing an acid component comprising non-linear polymerized fatty acids, and optionally, at least one acid selected from the group consisting of linear dicarboxylic and monocarboxylic acids; and an amine component comprising from about 90 to about 30 equivalent percent of 1,2-diaminopropane, and from about 10 to about 70 equivalent percent of a piperazine-containing diamine, with optionally from about 0.5 up to about 10 equivalent percent of the amine component comprising polyetherdiamine; and (2) an epoxy resin, said epoxy resin having at least two epoxy groups per molecule of epoxy resin;

wherein the initial ratio of free amine and acid groups of the polyamide resin to epoxy groups of the epoxy resin is between about 1:1 and 1:10.

23. The method of claim 22 wherein for the polyamide component, the amine component thereof comprises from about 70 to about 50 equivalent percent of 1,2-diaminopropane, and from about 30 to about 50 equivalent percent of a piperazine-containing diamine, with optionally from about 2.0 up to about 8 equivalent percent of a polyetherdiamine.

24. The method of claim 23 wherein the piperazine-containing polyamine comprises a member selected from the group consisting of piperazine, 1,2-di-(1-piperazinyl)propane, 1,3-di-(1-piperazinyl)propane, 1,2-di-(1-piperazinyl)ethane, 1,4-di-(1-piperazinyl)butane, and N-hydroxyethylpiperazine;and the polyetherdiamine comprises a member selected from the group consisting of diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000, including triamines made from propylene oxide polymers or ethylene oxide polymers and having molecular weights of from 100 to about 8000.

25. The method of claim 24, wherein for the polyamide resin component, the piperazine-containing polyamine comprises piperazine.

26. A method of increasing flexibility and strength while reducing tackiness of a stable, aqueous dispersion of polyamide resin particles in water, comprising the step of combining:

(a) between about 20% and about 60% by weight of a polyamide resin prepared by condensing an acid component comprising non-linear polymerized fatty acids, and optionally, at least one acid selected from the group consisting of linear dicarboxylic and monocarboxylic acids; and an amine component comprising from about 90 to about 30 equivalent percent of 1,2-diaminopropane, and from about 10 to about 70 equivalent percent of a piperazine-containing diamine, with optionally from about 0.5 up to about 10 equivalent percent of the amine component comprising polyetherdiamine;

(b) between about 30% and about 70% by weight water; and (c) at least one surfactant in an amount effective to form a water-in-oil emulsion upon liquification of the polyamide resin.

27. The method of claim 26 further comprising an amount of acid or base effective to neutralize residual acid or base on the polyamide resin.

28. The method of claim 26 wherein the surfactant is selected from the group consisting of anionic, cationic, non-ionic, and amphoteric surfactants.

29. The method of claim 26 wherein the amount of surfactant effective to form the water-in-oil emulsion is from about 0.05% to about 10% by weight, based on the weight of the polyamide resin.

30. The method of claim 26 wherein the piperazine-containing polyamide resin particles have a volume average size distribution of between about 1–20 microns.

* * * * *